United States Patent
Bahena et al.

(10) Patent No.: US 12,451,758 B2
(45) Date of Patent: Oct. 21, 2025

(54) BLADED BALANCING DISC

(71) Applicant: Schaeffler Technologies AG & Co. KG, Herzogenaurach (DE)

(72) Inventors: Rodrigo Bahena, Puebla (MX); David Arellano, Puebla (MX); Jessica Sampieri, Puebla (MX)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 297 days.

(21) Appl. No.: 18/208,925

(22) Filed: Jun. 13, 2023

(65) Prior Publication Data

US 2024/0421655 A1 Dec. 19, 2024

(51) Int. Cl.
*H02K 7/04* (2006.01)
*H02K 7/00* (2006.01)
*H02K 9/06* (2006.01)
*H02K 9/19* (2006.01)

(52) U.S. Cl.
CPC ............... *H02K 7/04* (2013.01); *H02K 7/003* (2013.01); *H02K 9/06* (2013.01); *H02K 9/19* (2013.01)

(58) Field of Classification Search
CPC ..... H01L 2223/6627; H01L 2223/6677; H01L 2224/16227; H01L 23/66; H01L 2924/15321; H01P 5/187; H01Q 1/2283; H01Q 1/24; H01Q 1/243; H01Q 21/0031; H01Q 21/0093; H01Q 21/065; H01Q 23/00; H01Q 5/335; H01Q 9/0407; H01Q 9/0414; H01Q 1/38; H01Q 1/46; H04M 1/0249; H04M 1/0277; H02K 1/32; H02K 7/003; H02K 7/04; H02K 9/06; H02K 9/19

See application file for complete search history.

(56) References Cited

U.S. PATENT DOCUMENTS

| | | | | |
|---|---|---|---|---|
| 5,925,960 | A | * 7/1999 | Hayes | H02K 17/20 29/889.3 |
| 7,628,586 | B2 | * 12/2009 | Feher | F04D 29/284 415/200 |
| 8,033,792 | B1 | 10/2011 | Morando | |
| 8,753,077 | B2 | * 6/2014 | Gupta | H02K 5/10 415/206 |
| 10,626,882 | B2 | * 4/2020 | Nakatani | F04D 17/16 |
| 2004/0263008 | A1 | * 12/2004 | Voigt | H02K 9/06 310/58 |

(Continued)

FOREIGN PATENT DOCUMENTS

| | | | | |
|---|---|---|---|---|
| FR | 2811158 | A1 | * 1/2002 | ........... F04D 29/281 |
| JP | 6451856 | B2 | 1/2019 | |
| RU | 2392499 | C2 | 6/2010 | |

*Primary Examiner* — Naishadh N Desai
(74) *Attorney, Agent, or Firm* — Volpe Koenig

(57) ABSTRACT

A bladed balancing disc for an electric motor is disclosed. The bladed balancing disc includes a first disc, a second disc, a plurality of blades, and at least one disc aperture. The first disc includes a first flange extending from the first disc in an axial direction relative to a central axis of the first disc, and the second disc is axially offset from the first disc in an extension direction of the first flange. Each of the plurality of blades extend between the first disc and the second disc. The at least one disc aperture extends through the first flange, fluidly coupling a volume radially inward of the first flange to a volume radially outward of the first flange.

19 Claims, 3 Drawing Sheets

(56) References Cited

U.S. PATENT DOCUMENTS

| | | | |
|---|---|---|---|
| 2006/0280609 A1* | 12/2006 | Ranz | F04D 29/284 |
| | | | 416/182 |
| 2019/0013717 A1* | 1/2019 | Li | H02K 9/16 |
| 2020/0381968 A1* | 12/2020 | Wakui | H02K 1/32 |
| 2022/0393544 A1* | 12/2022 | Fujii | H02K 3/345 |
| 2024/0322624 A1* | 9/2024 | Takahata | H02K 9/19 |

* cited by examiner

BLADED BALANCING DISC

FIELD OF INVENTION

The present disclosure is directed to a balancing disc for an engine, and more particularly it is directed to a bladed balancing disc for an electric motor of an electric vehicle.

BACKGROUND

Electric motors for electric vehicles can include a rotor coupled to a rotor shaft, such that the rotor rotates along with the rotor shaft. The rotor can include a plurality of rotor laminations that are positioned side by side and make up the overall rotor. Conventionally, balancing discs are utilized in electric motors to accomplish the main objective of holding the rotor laminations of the rotor securely in place during rotation of the rotor and the rotor shaft. Positioned radially outward of the rotor can be a stator including a plurality of stator end windings. During operation of the electric motor, the stator end windings generate heat and are therefore one of the components of the electric motor that are exposed to a high temperature operating environment. If the stator end windings are exposed to high enough temperatures, the stator end windings can overheat and cause lower efficiency of the electric motor, and sometimes even failure of the electric motor.

As such, there is a need to provide cooling to the stator end windings of the electric motor to increase the efficiency and prevent failure of the electric motor of the electric vehicle.

SUMMARY

According to one aspect, the present disclosure is directed to a bladed balancing disc for an electric motor. The bladed balancing disc includes a first disc, a second disc, a plurality of blades, and at least one disc aperture. The first disc includes a first flange extending from the first disc in an axial direction relative to a central axis of the first disc, and the second disc axially offset from the first disc in an extension direction of the first flange. Each of the plurality of blades extend between the first disc and the second disc. The at least one disc aperture extends through the first flange, fluidly coupling a volume radially inward of the first flange to a volume radially outward of the first flange.

In one aspect, the plurality of blades are integrally formed with and extend radially outwardly from the first flange.

In one aspect, the first flange extends parallel to the central axis.

In one aspect, the second disc includes a second flange extending from the second disc in a same direction as the extension direction of the first flange.

In one aspect, an annular gas inlet is located radially between the first flange and the second flange at a second end of the bladed balancing disc opposite the first disc.

In one aspect, the at least one disc aperture fluidly couples the volume radially inward of the first flange with the volume radially outward of the first flange that is located between the first disc and the second disc, and adjacent the plurality of blades.

In one aspect, each of the plurality of blades extend radially and are oriented at a non-parallel and non-perpendicular angle relative to the central axis.

In one aspect, each of the plurality of blades extend radially between a radially outer surface of the first flange and an outer circumference of the first disc and the second disc.

In one aspect, the first flange is adapted to be coupled to a rotor shaft of the electric motor, such that the bladed balancing disc is adapted to rotate with the rotor shaft.

In a further aspect, during rotation of the rotor shaft, the plurality of blades are adapted to force a fluid in a radial direction away from the central axis.

According to another aspect, the present disclosure is directed to an electric motor. The electric motor includes a rotor shaft configured to rotate about an axis of the rotor shaft. A rotor is disposed radially outward of the rotor shaft and coupled to the rotor shaft, such that the rotor rotates with the rotor shaft. A stator is fixedly disposed radially outward of the rotor, such that the stator remains stationary relative to the rotor. The stator comprises a plurality of stator end windings. A bladed balancing disc is disposed radially outward of the rotor shaft and coupled to the rotor shaft, such that the bladed balancing disc rotates with the rotor shaft. During rotation of the rotor shaft the bladed balancing disc forces a first fluid and a second fluid in a radial direction away from the axis of the rotor shaft and onto the stator end windings.

In one aspect, the rotor shaft is hollow and includes a fluid inlet disposed at an upstream end of the rotor shaft, the fluid inlet being fluidly coupled to a fluid source for receiving the first fluid from the fluid source.

In one aspect, the first fluid flows from the fluid inlet to at least one shaft aperture extending through the rotor shaft, the at least one shaft aperture being fluidly coupled to at least one disc aperture of the bladed balancing disc.

In one aspect, the first fluid is a liquid coolant, and the bladed balancing disc forces the liquid coolant received from the at least one shaft aperture radially outward onto the stator end windings.

In one aspect, the second fluid is a gas, and the bladed balancing disc draws the gas in through an annular gas inlet on an upstream end of the bladed balancing disc and forces the gas radially outward onto the stator end windings along with the first fluid.

In one aspect, the bladed balancing disc includes a plurality of blades extending between a first disc and a second disc of the bladed balancing disc, the plurality of blades being configured to force the first fluid and the second fluid in the radial direction away from the axis of the rotor shaft and onto the stator end windings.

In one aspect, the bladed balancing disc is disposed on an upstream end of the rotor.

In one aspect, the bladed balancing disc is disposed radially between the rotor shaft and the stator end windings.

According to yet another aspect, the present disclosure is directed to a method of reducing a temperature of a plurality of stator end windings coupled to a stator of an electric motor vehicle. The method includes rotating a rotor shaft about an axis of rotation of the rotor shaft; rotating a bladed balancing disc coupled to the rotor shaft about the axis of rotation; flowing a first fluid from a fluid source through a fluid inlet of the rotor shaft and into a hollow interior of the rotor shaft; flowing the first fluid from the hollow interior of the rotor shaft through at least one shaft aperture into an interior of the bladed balancing disc; distributing the first fluid from the interior of the bladed balancing disc radially outward via a plurality of radially extending blades of the bladed balancing disc onto the plurality of stator end windings; and removing heat, by the first fluid, from the plurality of stator end windings.

In one aspect, the method further includes drawing a second fluid into the interior of the bladed balancing disc through an annular gas inlet of the bladed balancing disc during rotation of the bladed balancing disc; distributing the second fluid from the interior of the bladed balancing disc radially outward along with the first fluid onto the plurality of stator end windings; and removing heat, by the second fluid, from the plurality of stator end windings.

BRIEF DESCRIPTION OF THE DRAWING(S)

The foregoing Summary as well as the following Detailed Description will be best understood when read in conjunction with the appended drawings, which illustrate a preferred embodiment of the disclosure. In the drawings.

DETAILED DESCRIPTION

Figure 1:
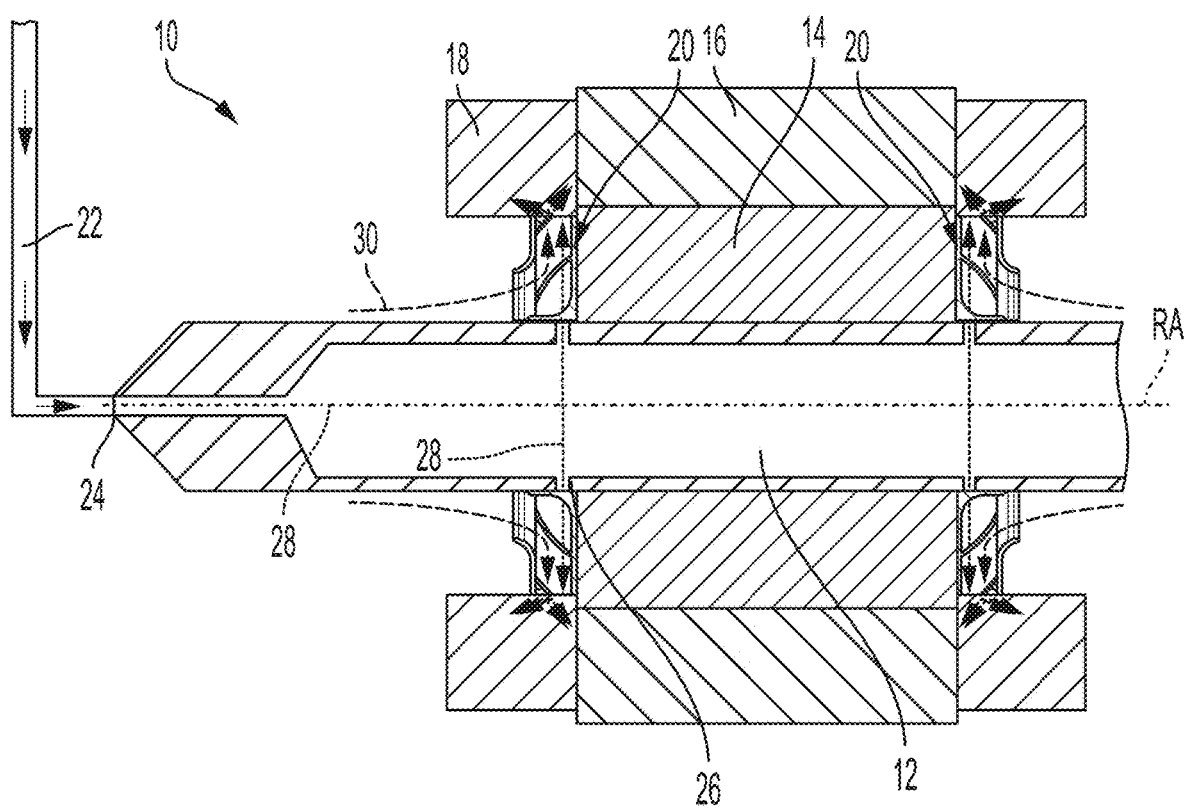
FIG. 1 is a partial cross-sectional view of a portion of an electric motor of an electric vehicle including a bladed balancing disc of the present disclosure.

Certain terminology is used in the following description for convenience only and is not limiting. The words "front", "rear", "upper", and "lower" designate directions in the drawings to which reference is made. The words "inwardly" and "outwardly" refer to directions towards and away from parts referenced in the drawings. "Axially" refers to a direction along the axis of a shaft or any other cylindrical member. A reference to a list of items that are cited as "at least one of a, b, or c" (where a, b, and c represent the items being listed) means any single one of the items a, b, or c, or combinations thereof are included. The terms "about" and "approximately" encompass +/−10% of an indicated value unless otherwise noted. The terminology includes the words specifically noted above, derivatives thereof and words of similar import.

FIG. 1 is a partial cross-sectional view of a portion of an electric motor 10 of an electric vehicle (not shown). The electric motor 10 can include a rotor shaft 12, a rotor 14, a stator 16 including a plurality of stator end windings 18, a bladed balancing disc 20, and a fluid source 22. The electric motor 10 can be a motor that is utilized in an electric vehicle to propel an electric vehicle in a desired direction. The electric motor 10 can include many other components not specifically listed, and it is to be understood that the components listed are not limiting but rather are for exemplary purposes. Further, it is to be understood that the electric motor 10 can include at least one bladed balancing disc 20, and that the following disclosure will generally only discuss one of the bladed balancing discs 20, but the discussion equally applies to both bladed balancing discs 20. In some examples, as illustrated, the electric motor 10 can include two bladed balancing discs 20, with each positioned on opposite axial ends of the rotor 14, discussed further below.

As illustrated, the rotor shaft 12 is the central component of the electric motor 10 and the rotor shaft 12 is adapted to rotate about a (central) rotation axis RA of the rotor shaft 12. The rotor shaft 12 is a hollow shaft in which an interior of the rotor shaft 12 is open to allow a fluid to flow through the hollow interior of the rotor shaft 12. The rotor shaft 12 includes a fluid inlet 24 positioned at an upstream end of the rotor shaft 12 for allowing a fluid to flow into the hollow interior of the rotor shaft 12. Further, the rotor shaft 12 includes at least one shaft aperture 26 that extends fully through the sidewall of the rotor shaft 12, such that the at least one shaft aperture 26 extends from the hollow interior of the rotor shaft 12 to an external surface or circumference of the rotor shaft 12. In some examples, the rotor shaft 12 can include two or more shaft apertures 26 extending through the sidewalls of the rotor shaft 12. In some examples, the rotor shaft 12 can include four or more shaft apertures 26 extending through the sidewalls of the rotor shaft 12.

It is to be understood that the phrases "upstream" and "downstream" as disclosed in the present disclosure refer to the direction in which fluid flows into and through the rotor shaft 12. More specifically, the upstream end refers to the left side of FIG. 1 (as illustrated) and the downstream end refers to the right side of FIG. 1 (as illustrated). As such, fluid flows into the rotor shaft 12 through the fluid inlet 24 at the upstream end of the rotor shaft 12 (the left end) and the fluid flows through the rotor shaft 12 in a direction towards the downstream end of the rotor shaft 12 (the right end). Other components and features of the following disclosure may reference "upstream" and "downstream", and it is to be understood that it refers to the same direction or coordinate system as the rotor shaft 12.

The rotor 14 is positioned radially outward from the rotor shaft 12, with respect to the rotation axis RA of the rotor shaft 12. Further, the rotor 14 is coupled to the radially outer surface of the rotor shaft 12 such that the rotor 14 rotates with the rotor shaft 12 during rotation of the rotor shaft 12. The stator 16 is positioned radially outward from the rotor 14, with respect to the rotation axis RA of the rotor shaft 12 (and an axis of the rotor 14). The stator 16 is fixedly coupled within the electric motor 10, such that the stator 16 remains fixed in position during rotation of the rotor 14 and the rotor shaft 12. The stator 16 includes a plurality of stator end windings 18 disposed at both an upstream end of the stator 16 and a downstream end of the stator 16, and extending axially outward past the upstream and downstream ends, respectively, of the stator 16. As such, the stator end windings 18 remain fixed or stationary during rotation of the rotor 14 and the rotor shaft 12.

The bladed balancing disc 20 is positioned radially outward from the rotor shaft 12, with respect to the rotation axis RA of the rotor shaft 12. Further, the bladed balancing disc 20 is coupled to the rotor shaft 12, such that the bladed balancing disc 20 rotates with the rotor shaft 12 during rotation of the rotor shaft 12. As illustrated, in some examples, the electric motor 10 can include two bladed balancing discs 20, with one bladed balancing disc 20 positioned upstream of the rotor 14 and the stator 16, and the other bladed balancing disc 20 positioned downstream of the rotor 14 and the stator 16.

More specifically, the bladed balancing discs 20 are positioned directly adjacent and abutting the rotor 14, with one bladed balancing disc 20 at the upstream end and another bladed balancing disc 20 at the downstream end, such that the bladed balancing discs 20 rotates with the rotor 14. The bladed balancing discs 20 are also positioned radially between the rotor shaft 12 and the stator end windings 18. More specifically, the bladed balancing discs 20 are positioned radially between a radially outer surface of the rotor shaft 12 and a radially inner surface of the stator end windings 18. The specific orientation and positioning of the bladed balancing discs 20 allow the bladed balancing discs 20 to direct at least one fluid onto the stator end windings 18 to cool and reduce the temperature of the stator end windings 18, discussed further below.

The fluid source 22 is coupled to the upstream end of the rotor shaft 12, and the fluid source 22 is configured to provide a fluid to the rotor shaft 12. More specifically, the fluid source 22 is fluidly coupled to the fluid inlet 24 of the rotor shaft 12, and the fluid source 22 is configured to provide a fluid to the rotor shaft 12 through the fluid inlet 24. As illustrated, the fluid source 22 is shown as a pipe, conduit, tube, or the like that includes arrows indicating the flow direction of the fluid from the fluid source 22 to the fluid inlet 24 of the rotor shaft 12. The fluid source 22 can be a tank, reservoir, transmission sump, or any other source that can collect and hold a fluid. In some examples, the fluid source 22 can be a coolant reservoir within the electric vehicle, such that coolant can be transferred from the fluid source 22 to the fluid inlet 24 of the rotor shaft 12. In other examples, the fluid source 22 can be an oil reservoir within the electric vehicle, such that oil can be transferred from the fluid source 22 to the fluid inlet 24 of the rotor shaft 12.

In operation, fluid (e.g., a coolant or oil) flows from the fluid source 22 to the fluid inlet 24 of the rotor shaft 12, where the fluid enters and flows into the hollow interior of the rotor shaft 12. The fluid then flows downstream through the hollow interior of the rotor shaft 12 until the fluid reaches the at least one shaft aperture 26. Due to the rotation of the rotor shaft 12, the fluid is directed radially outward and at least some of the fluid flowing through the rotor shaft 12 enters and flows through the at least one shaft aperture 26 into an interior of the bladed balancing discs 20. The rotation of the bladed balancing discs 20 forces the fluid that enters the bladed balancing discs 20 to be directed radially outward at an increased velocity onto the stator end windings 18. The fluid that is directed onto the stator end windings 18 can then be used to cool and reduce the temperature of the stator end windings 18.

In addition, as illustrated by the arrows in FIG. 1, the bladed balancing discs 20 can also pull or draw gas (i.e., air) into the interior of the bladed balancing discs 20 and then the gas can be directed and dispensed onto the stator end windings 18 to further cool and reduce the temperature of the stator end windings 18. As such, the fluid flowing through the hollow interior of the rotor shaft 12 can be referred to as the first fluid 28 and the gas or air being drawn into the bladed balancing discs 20 can be referred to as the second fluid 30. Therefore, during rotation of the rotor shaft 12, the bladed balancing discs 20 force the first fluid 28 and the second fluid 30 in a radial direction away from the rotation axis RA of the rotor shaft 12 and onto the stator end windings 18 to cool and reduce the temperature of the stator end windings 18. Preferably, during rotation of the rotor shaft 12 the bladed balancing discs 20 at least partially mix the first fluid 28 and the second fluid 30 while radially directing the fluids away from the rotation axis RA of the rotor shaft 12 and onto the stator end windings 18 as a sprayed on mixture.

Based on the above, it is to be understood that a method of reducing a temperature of the plurality of stator end windings 18 of the stator 16 is also provided. The method can include the followings steps. Rotating the rotor shaft 12 about the rotation axis RA of the rotor shaft 12. Rotating the bladed balancing discs 20 coupled to the rotor shaft 12 about the rotation axis RA. Flowing the first fluid 28 from the fluid source 22 through the fluid inlet 24 of the rotor shaft 12 and into a hollow interior of the rotor shaft 12. Flowing the first fluid 28 from the hollow interior of the rotor shaft 12 through at least one shaft aperture 26 into an interior of the bladed balancing discs 20. Distributing the first fluid 28 from the interior of the bladed balancing discs 20 radially outward via a plurality of radially extending blades of the bladed balancing discs 20 onto the plurality of stator end windings 18. Removing heat, by the first fluid 28, from the plurality of stator end windings 18.

Additionally, the method can include drawing the second fluid 30 into the interior of the bladed balancing discs 20 through an annular gas inlet of the bladed balancing discs 20 during rotation of the bladed balancing discs 20. Distributing the second fluid 30 from the interior of the bladed balancing discs 20 radially outward along with the first fluid 28 onto the plurality of stator end windings 18, preferably as a sprayed on mixture, to remove heat from the plurality of stator end windings 18. It is to be understood that the disclosed method steps are exemplary steps and the method can include more or fewer than the listed steps without taking away from the present disclosure.

Figure 3:
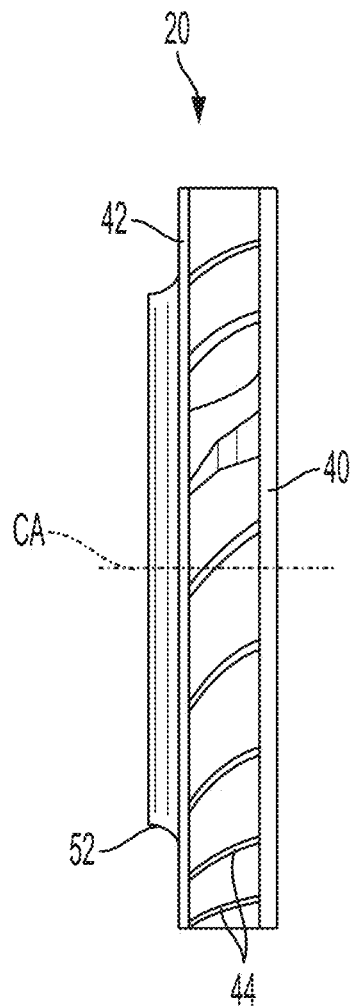
FIG. 3 is a side view of the bladed balancing disc of the present disclosure.
Figure 4:
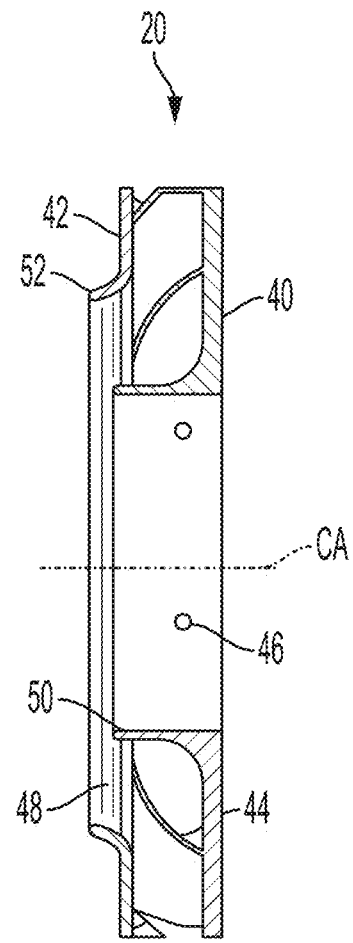
FIG. 4 is a cross-sectional view of the bladed balancing disc taken along Section 4-4 illustrated in FIG. 2.

The specific features of the bladed balancing discs 20 that cause the radial dispensing of the first fluid 28 and the second fluid 30 will be discussed in detail with respect to FIGS. 2-4, below. Further, it is to be understood that the following disclosure will discuss only one of the bladed balancing discs 20, but the following discussion equally applies to both of the bladed balancing discs 20 of the electric motor 10.

Figure 2:
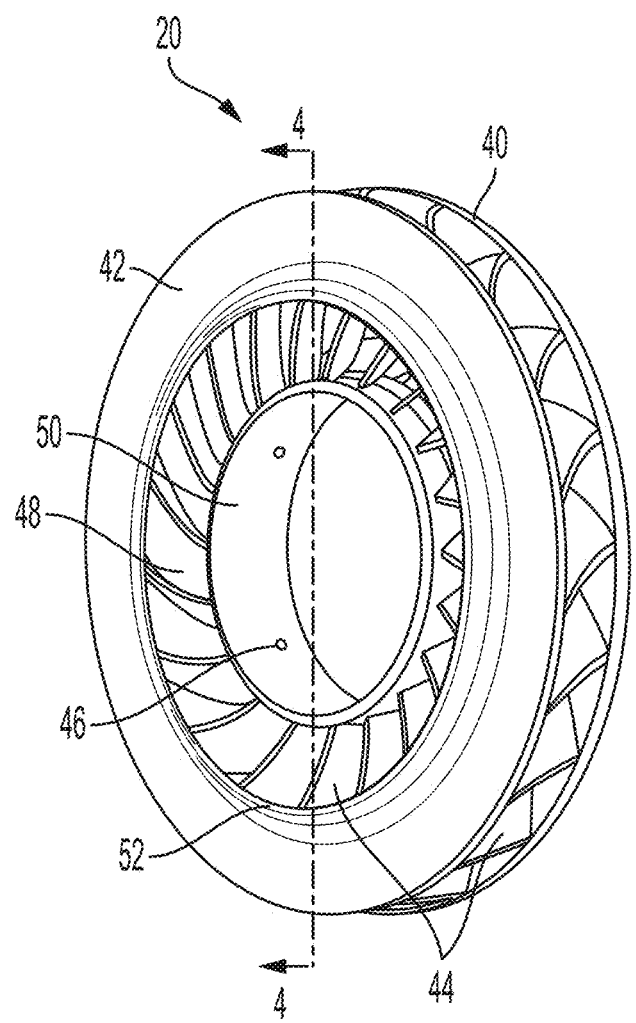
FIG. 2 is a perspective view of the bladed balancing disc of the present disclosure.

FIG. 2 is a perspective view of the bladed balancing disc 20. FIG. 3 is a side view of the bladed balancing disc 20. FIG. 4 is a cross-sectional view of the bladed balancing disc 20 taken along Section 4-4 in FIG. 2. FIGS. 2-4 will be discussed together. As discussed, the bladed balancing disc 20 is configured to be utilized in an electric motor 10 of an electric vehicle. Further, the bladed balancing disc 20 is adapted to be coupled to the rotor shaft 12 of the electric motor 10, such that the bladed balancing disc 20 is adapted to rotate with the rotor shaft 12 during operation of the electric motor 10. Additionally, as illustrated in FIG. 1, a single bladed balancing disc 20 is disposed at each axially end of the rotor 14, such that the bladed balancing discs 20 are configured to aid in holding the rotor 14 (i.e., rotor laminations) securely together during rotation of the rotor 14 and the bladed balancing discs 20, discussed further below.

The bladed balancing disc 20 can include a first disc 40, a second disc 42, a plurality of blades 44, at least one disc aperture 46, and an annular gas inlet 48. The first disc 40 is a component of the bladed balancing disc 20 having a circular cross-sectional area viewing in an axial direction along a central axis CA of the first disc 40 (and the overall bladed balancing disc 20). The first disc 40 is disposed at a first axial end of the bladed balancing disc 20, and the first disc 40 includes a first flange 50 extending from the first disc 40 in an axial direction relative to the central axis CA of the first disc 40. More specifically, the first flange 50 extends parallel to the central axis CA in a direction away from the first axial end of the bladed balancing disc 20 towards a second axial end of the bladed balancing disc 20, and the second disc 42. Further, the first flange 50 extends from the first disc 40 at a location radially inward of an outer circumference of the first disc 40, with respect to the central axis CA.

The second disc 42 is a component of the bladed balancing disc 20 having a circular cross-sectional area viewing in the axial direction along the central axis CA. The second disc 42 is axially offset from the first disc 40 in an extension direction of the first flange 50, such that the second disc 42 is disposed at the second axial end of the bladed balancing disc 20. The second disc 42 includes a second flange 52 extending from the second disc 42 in a same direction as the extension direction of the first flange 50. In the illustrated embodiment, shown best in FIG. 4, the second flange 52 is oriented non-parallel and non-perpendicular with respect to the central axis CA. In other embodiments, the second flange 52 can be parallel with the central axis CA, similar to the first flange 50. The second flange 52 extends from the second disc 42 at a location radially inward of an outer circumference of the second disc 42, with respect to the central axis CA. Further, the second flange 52 is disposed radially outward of the first flange 50 and radially inward of the outer circumference of the first disc 40 and the second disc 42.

The plurality of blades 44 extend between and are coupled to the first disc 40 and the second disc 42. In some examples, the plurality of blades 44 can be integrally formed with the first disc 40 and the second disc 42, such that the first disc 40, the second disc 42, and each of the plurality of blades 44 are constructed from a single, monolithic component or material. In addition, the plurality of blades 44 can be integrally formed with and extend radially outwardly from the first flange 50 of the first disc 40. As illustrated, each of the plurality of blades 44 extend in a radial direction and each of the plurality of blades 44 are oriented at a non-parallel and non-perpendicular angle relative to the central axis CA. Each blade 44 may have a curved or airfoil-shape in cross-section to increase the efficiency with which it draws in the second fluid 30 axially prior to discharging it radially along with the first fluid 28, as explained in further detail below. In some examples, each of the plurality of blades 44 can extend radially between a radially outer surface of the first flange 50 and an outer circumference of the first disc 40 and the second disc 42. In other examples, each of the plurality of blades 44 can extend from the radially outer surface of the first flange 50 but may not extend radially to the outer circumference such that each of the plurality of blades 44 terminate before the outer circumference of the first disc 40 and the second disc 42. The plurality of blades 44 are the component/feature of the bladed balancing disc 20 that forces the fluid in a radial direction away from the central axis CA during rotation of the rotor shaft 12, discussed further below.

The bladed balancing disc 20 can also include at least one disc aperture 46 extending through the first flange 50 of the first disc 40. The at least one disc aperture 46 can be of any desired shape and size, depending on the fluid flow requirements for each specific cooling application. The at least one disc aperture 46 fluidly couples a volume disposed radially inward of the first flange 50 to a volume disposed radially outward of the first flange 50. More specifically, the at least one disc aperture 46 fluidly couples the volume radially inward of the first flange 50 with the volume radially outward of the first flange 50 that is located between the first disc 40 and the second disc 42, and adjacent the plurality of blades 44. As such, the at least one disc aperture 46 allows fluid to flow from the volume radially inward of the first flange 50 to the volume radially outward of the first flange 50.

The bladed balancing disc 20 can further include the annular gas inlet 48, which is located radially between the first flange 50 and the second flange 52 and axially at the second axially end of the bladed balancing disc 20 adjacent the second disc 42 and opposite the first disc 40. In the illustrated embodiment, the annular gas inlet 48 includes a generally a circular ring shape viewing in the axially direction along the central axis CA. In other embodiments, the annular gas inlet 48 can have a cross-section shape differing from the circular ring shape. The annular gas inlet 48 is an opening in the upstream end of the bladed balancing disc 20 that is configured, during rotation of the bladed balancing disc 20, to draw the second fluid 30 in through the annular gas inlet 48 and then force the second fluid 30 radially outward onto the stator end windings 18, along with the first fluid 28. In some examples, during rotation of the bladed balancing disc 20, the annular gas inlet 48 is configured to draw a gas (i.e., air) in through the annular gas inlet 48 and then force the gas (i.e., air) radially outward onto the stator end windings 18 to cool and reduce the temperature of the stator end windings 18.

Referring again to FIG. 1, in operation oil flows from the fluid source 22 to the fluid inlet 24 of the rotor shaft 12, where the oil enters and flows into the hollow interior of the rotor shaft 12. The oil then flows downstream through the hollow interior of the rotor shaft 12 until the oil reaches the at least one shaft aperture 26. Due to the rotation of the rotor shaft 12, the oil is directed radially outward and at least some of the oil flowing through the rotor shaft 12 enters and flows through the at least one shaft aperture 26 into the at least one disc aperture 46, which is fluidly coupled to that least one shaft aperture 26, and into the interior of the bladed balancing discs 20. Additionally, it is to be understood that a first portion of the oil can flow into the bladed balancing disc 20 positioned at the upstream end of the rotor shaft 12, and a second portion of the oil can flow into the bladed balancing disc 20 positioned at the downstream end of the rotor shaft 12.

The rotation of the bladed balancing discs 20 forces the oil that enters the bladed balancing discs 20 to be directed radially outward at an increased velocity onto the stator end windings 18. More specifically, the plurality of blades 44 extending between the first disc 40 and the second disc 42 (of each bladed balancing disc 20) are adapted to force the oil in the radial direction away from the rotation axis RA of the rotor shaft 12 and onto the stator end windings 18. The oil that is directed onto the stator end windings 18 can then be used to cool and reduce the temperature of the stator end windings 18.

Simultaneously, the upstream and the downstream bladed balancing discs 20 draw air into the interior of the bladed balancing disc 20 from the upstream end and the downstream end, respectively, of the bladed balancing discs 20 through the annular gas inlet 48. The air that is drawn into the bladed balancing discs 20 is then directed and dispensed onto the stator end windings 18 to further cool and reduce the temperature of the stator end windings 18. Therefore, during rotation of the rotor shaft 12 and the bladed balancing discs 20, the bladed balancing discs 20 force the oil and the air in a radial direction away from the rotation axis RA of the rotor shaft 12 and onto the stator end windings 18 to cool and reduce the temperature of the stator end windings 18. It is to be understood that during rotation of the rotor shaft 12 and the bladed balancing discs 20, the oil and the air can at least partially mix within the bladed balancing discs 20 and while being radially directed away from the rotation axis RA of the rotor shaft 12 and onto the stator end windings 18.

The bladed balancing discs 20 of the present disclosure can be utilized to hold rotor laminations of the rotor 14 securely in place during rotation of the rotor 14 and the rotor shaft 12, as is conventionally done with balancing discs. Further, those skilled in the art will appreciate that the bladed balancing discs 20 of the present disclosure are adapted to redirect oil, break apart the oil into a spray pattern, and add forced air convection to increase the cooling capabilities of the stator end windings 18. As such, the bladed balancing discs 20 of the present disclosure can be utilized to provide cooling to the stator end windings 18 of the electric motor 10 to increase the efficiency of the electric motor 10 and to prevent failure of the electric motor 10 of the electric vehicle.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

LOG OF REFERENCE NUMERALS

10 Electric Motor
12 Rotor Shaft
14 Rotor
16 Stator
18 Stator End Windings
20 Bladed Balancing Disc(s)
22 Fluid Source
24 Fluid Inlet
26 Shaft Aperture
28 First Fluid
30 Second Fluid
40 First Disc
42 Second Disc
44 Plurality of Blades
46 Disc Aperture
48 Annular Gas Inlet
50 First Flange
52 Second Flange
RA Rotation Axis
CA Central Axis

What is claimed is:

1. A bladed balancing disc for an electric motor, the bladed balancing disc comprising:
    a first disc including a first flange extending from the first disc in an axial direction relative to a central axis of the first disc;
    a second disc axially offset from the first disc in an extension direction of the first flange;
    a plurality of blades extending between the first disc and the second disc; and
    at least one disc aperture extending through the first flange, fluidly coupling a volume radially inward of the first flange to a volume radially outward of the first flange.

2. The bladed balancing disc of claim 1, wherein the plurality of blades are integrally formed with and extend radially outwardly from the first flange.

3. The bladed balancing disc of claim 1, wherein the first flange extends parallel to the central axis.

4. The bladed balancing disc of claim 1, wherein the second disc includes a second flange extending from the second disc in a same direction as the extension direction of the first flange.

5. The bladed balancing disc of claim 4, further comprising an annular gas inlet located radially between the first flange and the second flange at a second end of the bladed balancing disc opposite the first disc.

6. The bladed balancing disc of claim 1, wherein the at least one disc aperture fluidly couples the volume radially inward of the first flange with the volume radially outward of the first flange that is located between the first disc and the second disc, and adjacent the plurality of blades.

7. The bladed balancing disc of claim 1, wherein each of the plurality of blades extend radially and are oriented at a non-parallel and non-perpendicular angle relative to the central axis.

8. The bladed balancing disc of claim 1, wherein each of the plurality of blades extend radially between a radially outer surface of the first flange and an outer circumference of the first disc and the second disc.

9. The bladed balancing disc of claim 1, wherein the first flange is adapted to be coupled to a rotor shaft of the electric motor, such that the bladed balancing disc is adapted to rotate with the rotor shaft.

10. The bladed balancing disc of claim 9, wherein during rotation of the rotor shaft, the plurality of blades are adapted to force a fluid in a radial direction away from the central axis.

11. An electric motor comprising:
    a rotor shaft configured to rotate about an axis of the rotor shaft;
    a rotor disposed radially outward of the rotor shaft and coupled to the rotor shaft, such that the rotor rotates with the rotor shaft;
    a stator fixedly disposed radially outward of the rotor, such that the stator remains stationary relative to the rotor;
    the stator comprising a plurality of stator end windings; and
    a bladed balancing disc disposed radially outward of the rotor shaft and coupled to the rotor shaft, such that the bladed balancing disc rotates with the rotor shaft, wherein during rotation of the rotor shaft the bladed balancing disc forces a first fluid and a second fluid in a radial direction away from the axis of the rotor shaft and onto the stator end windings.

12. The electric motor of claim 11, wherein the rotor shaft is hollow and includes a fluid inlet disposed at an upstream end of the rotor shaft, the fluid inlet being fluidly coupled to a fluid source for receiving the first fluid from the fluid source.

13. The electric motor of claim 12, wherein the first fluid flows from the fluid inlet to at least one shaft aperture extending through the rotor shaft, the at least one shaft aperture being fluidly coupled to at least one disc aperture of the bladed balancing disc.

14. The electric motor of claim 13, wherein the first fluid is a liquid coolant, and the bladed balancing disc forces the liquid coolant received from the at least one shaft aperture radially outward onto the stator end windings.

15. The electric motor of claim 11, wherein the second fluid is a gas, and the bladed balancing disc draws the gas in through an annular gas inlet on an upstream end of the bladed balancing disc and forces the gas radially outward onto the stator end windings along with the first fluid.

16. The electric motor of claim 11, wherein the bladed balancing disc includes a plurality of blades extending between a first disc and a second disc of the bladed balancing disc, the plurality of blades being configured to force the first fluid and the second fluid in the radial direction away from the axis of the rotor shaft and onto the stator end windings.

17. The electric motor of claim 11, wherein the bladed balancing disc is disposed on an upstream end of the rotor.

18. The electric motor of claim 11, wherein the bladed balancing disc is disposed radially between the rotor shaft and the stator end windings.

19. A method of reducing a temperature of a plurality of stator end windings coupled to a stator of an electric motor vehicle, the method comprising:
   rotating a rotor shaft about an axis of rotation of the rotor shaft;
   rotating a bladed balancing disc coupled to the rotor shaft about the axis of rotation;
   flowing a first fluid from a fluid source through a fluid inlet of the rotor shaft and into a hollow interior of the rotor shaft;
   flowing the first fluid from the hollow interior of the rotor shaft through at least one shaft aperture into an interior of the bladed balancing disc;
   distributing the first fluid from the interior of the bladed balancing disc radially outward via a plurality of radially extending blades of the bladed balanced disc onto the plurality of stator end windings; and
   removing heat, by the first fluid, from the plurality of stator end windings;
   drawing a second fluid into the interior of the bladed balancing disc through an annular gas inlet of the bladed balancing disc during rotation of the bladed balancing disc; and
   distributing the second fluid from the interior of the bladed balancing disc radially outward along with the first fluid onto the plurality of stator end windings; and
   removing heat, by the second fluid, from the plurality of stator end windings.

* * * * *